(12) United States Patent
Tuttle

(10) Patent No.: US 6,388,561 B1
(45) Date of Patent: *May 14, 2002

(54) METHOD AND APPARATUS FOR REMOTE DATA TELEMETRY AND POINT OF SALE METHOD AND APPARATUS

(75) Inventor: John R. Tuttle, Boise, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,130

(22) Filed: Apr. 30, 1998

(51) Int. Cl.[7] .................................................. H04Q 7/00
(52) U.S. Cl. ..................... 340/10.1; 340/572.1; 340/5.9; 340/570
(58) Field of Search ........................ 340/825, 54, 572.1, 340/572.4, 572.8, 572, 10.1, 10.5, 5.9, 570; 705/1; 371/37.1; 342/50, 42; 709/253, 231, 103; 222/651; 725/24; 235/22

(56) References Cited

U.S. PATENT DOCUMENTS

| 4,075,632 A | | 2/1978 | Baldwin et al. ............. 343/6.8 |
|---|---|---|---|
| 4,186,381 A | * | 1/1980 | Fleischer .................... 222/651 |
| 4,348,740 A | * | 9/1982 | White ......................... 709/253 |
| 4,926,182 A | | 5/1990 | Ohta et al. .................... 342/44 |
| 5,151,684 A | * | 9/1992 | Johnsen ...................... 340/572 |
| 5,195,183 A | * | 3/1993 | Miller ......................... 709/231 |
| 5,202,825 A | * | 4/1993 | Miller ......................... 364/405 |
| 5,226,177 A | * | 7/1993 | Nickerson .................... 725/24 |
| 5,252,979 A | * | 10/1993 | Nysen ......................... 342/50 |
| 5,490,275 A | * | 2/1996 | Sandvos ...................... 709/103 |
| 5,525,992 A | * | 6/1996 | Froschermeier .............. 342/42 |
| 5,608,739 A | * | 3/1997 | Snodgrass et al. ......... 371/37.1 |
| 5,621,412 A | | 4/1997 | Sharpe et al. ................. 342/51 |
| 5,649,296 A | | 7/1997 | MacLellan et al. ......... 455/38.2 |
| 5,940,006 A | * | 8/1999 | MacLellan et al. ..... 340/825.54 |
| 5,963,133 A | * | 10/1999 | Monjo ..................... 340/572.1 |

* cited by examiner

*Primary Examiner*—Edwin C. Holloway, III
(74) *Attorney, Agent, or Firm*—Wells St. John P.S.

(57) ABSTRACT

A remote data telemetry device comprising a wireless identification device; a tactile input device; and a decoder coupled to the tactile input device and the wireless identification device, the wireless identification device being configured to transmit data input into the tactile input device. A method of manufacturing a point of sale terminal, the method comprising coupling a radio frequency identification device to a keyboard and configuring the radio frequency identification device to transmit, by radio frequency, data entered into the keyboard.

18 Claims, 3 Drawing Sheets

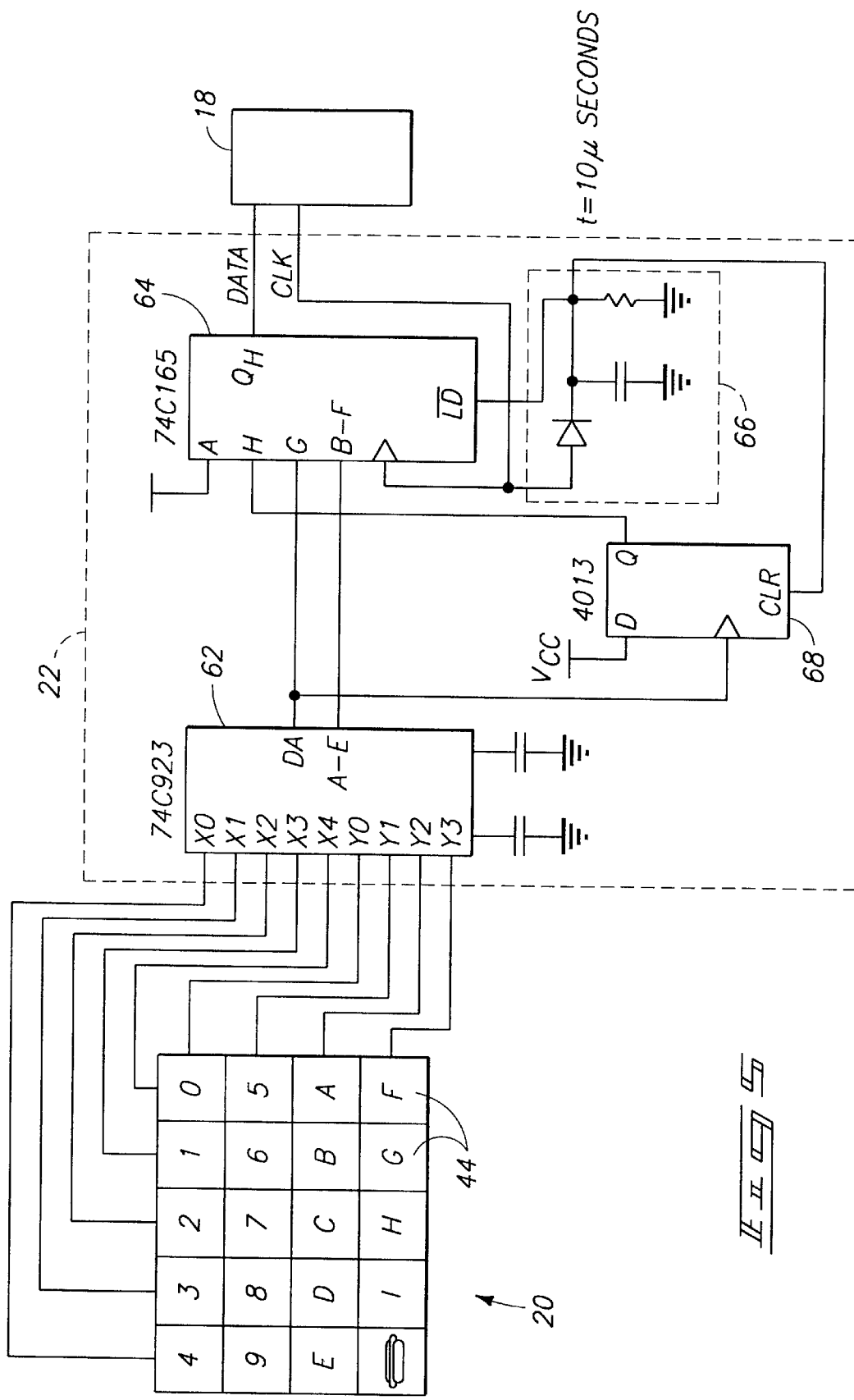

METHOD AND APPARATUS FOR REMOTE DATA TELEMETRY AND POINT OF SALE METHOD AND APPARATUS

TECHNICAL FIELD

The invention relates to remote data telemetry and point of sale terminals. The invention also relates to radio frequency identification devices.

BACKGROUND OF THE INVENTION

Electronic identification systems, such as those including radio frequency identification devices, are known in the art. Most presently available radio frequency identification devices utilize a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large, board level, active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, they do not need to be in close proximity to an interrogator or reader to receive power via magnetic coupling. Therefore, active transponder devices tend to be more suitable for applications requiring tracking of something that may not be in close proximity to an interrogator, such as a railway car.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

An electronic identification system typically includes two transponders: an interrogator, and a transponder device which replies to the interrogator. An electronic identification system which can be used as a radio frequency identification device, and various applications for such devices are described in detail in commonly assigned U.S. patent application Ser. No. 08/705,043, filed Aug. 29, 1996, now U.S. Pat. No. 6,130,602, and incorporated herein by reference.

Point of sale data input devices or terminals are known in the art. Such data input devices usually include keyboards. These input devices are more modern versions of mechanical cash registers. The point of sale devices may still control a cash drawer but are more powerful and customizable than the old cash registers. For example, pushing a key may result in both a calculation of the cost of a certain combination of products as well as transmission of a request that such products be produced. Some systems further attempt to further monitor inventory of either finished products or raw components based on entries at point of sale devices indicating that a finished product has been sold. The keys on point of sale devices or terminals may be spring loaded keys such as those found on computer keyboards, light touch keys or membrane keys, keys on a touch screen interface, etc.

It is desirable in some applications to enter data remotely, in a wireless fashion. This is true, for example, in retail sales order entry, inventorying, and fast food ordering.

SUMMARY OF THE INVENTION

The invention provides a method and apparatus for remote data telemetry device. The apparatus includes a wireless identification device, a tactile input device, and a decoder coupled to the tactile input device and the wireless identification device. The wireless identification device is configured to receive data that is input into the tactile input device and to transmit the data in a wireless manner.

Another aspect of the invention provides a point of sale device comprising a keyboard, a keyboard decoder coupled to the keyboard, and a radio frequency identification device coupled to the keyboard. The radio frequency identification device is configured to transmit, by radio frequency, data entered into the keyboard.

Another aspect of the invention provides a system comprising an interrogator; and a remote data telemetry device. The remote data telemetry device includes a wireless identification device, a data input device, and a decoder coupled to the data input device and the wireless identification device. The wireless identification device is configured to transmit data input into the data input device to the interrogator.

Another aspect of the invention provides a method of manufacturing a device for remote data telemetry. The method comprises coupling a decoder to a tactile input device and a wireless identification device, and configuring the wireless identification device to transmit data that is input into the tactile input device. Another aspect of the invention provides a method of remote data telemetry. The method comprises entering data into the data input device and effecting wireless transmission of the data from the remote data telemetry device to the interrogator.

Another aspect of the invention provides a method of manufacturing a point of sale terminal. The method comprises coupling a radio frequency identification device to a keyboard and configuring the radio frequency identification device to transmit, by radio frequency, data entered into the keyboard.

In one aspect of the invention, a radio frequency identification device or wireless identification device is modified to act as a telemetry device and is coupled to a keyboard for remote data entry. The keyboard can be a very inexpensive one. The invention can be used in retail sales order entry, inventorying, fast food monitoring, or other applications. Keyboard decoder circuitry can either be added to a radio frequency identification device integrated circuit, or can be separate from the radio frequency identification device integrated circuit. The decoder circuitry is connected between the keyboard and the radio frequency identification device.

BRIEF DESCRIPTION OF THE DRAWINGS

Preferred embodiments of the invention are described below with reference to the following accompanying drawings.

FIG. 5 is a circuit diagram illustrating components in the remote data telemetry device of FIG. 1.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
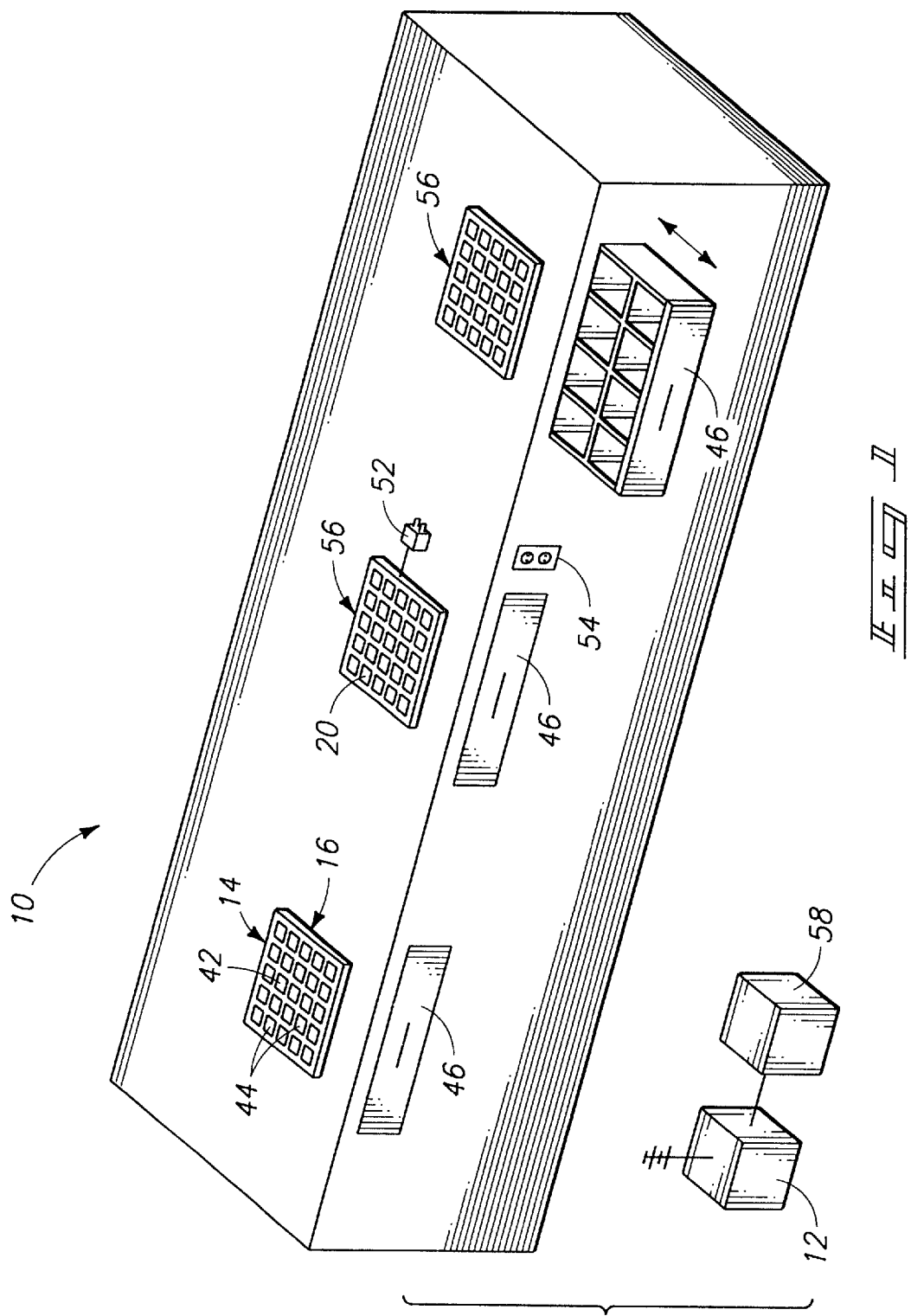
FIG. 1 is a perspective view showing a system embodying the invention, including a remote data telemetry device.
Figure 2:
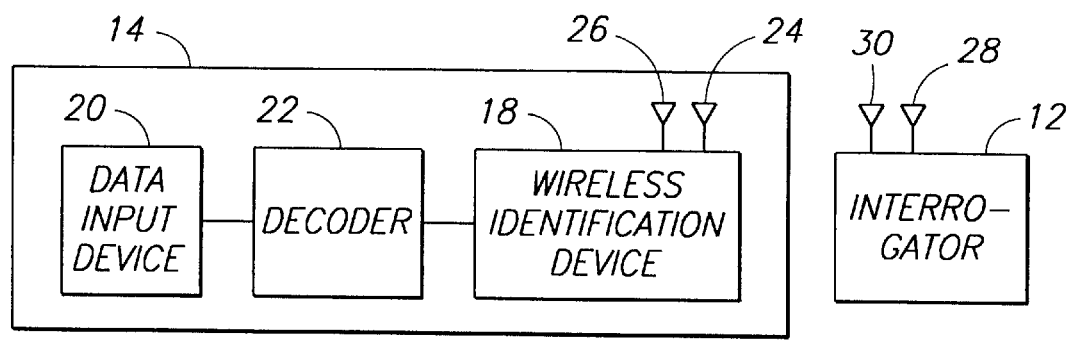
FIG. 2 is a block diagram illustrating components, including a wireless identification device, in the remote data telemetry device of FIG. 1.
Figure 3:
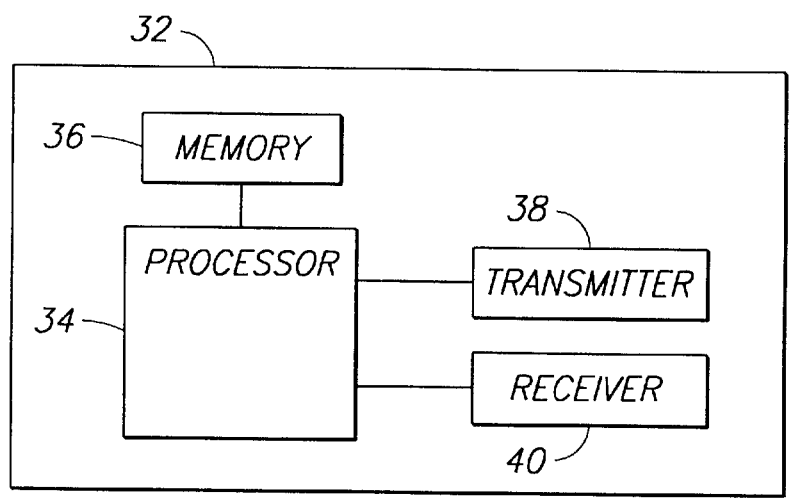
FIG. 3 is a block diagram illustrating components included in the wireless identification device of FIG. 2.

FIG. 1 illustrates a system 10 in accordance with one embodiment of the invention. The system includes an interrogator 12, and a remote data telemetry device 14. In the illustrated embodiment, the remote data telemetry device 14 is in the form of a point of sale device or terminal 16. The remote data telemetry device 14 includes a wireless identification device 18, a data input device 20, and a interface or decoder 22 coupled to the data input device 20 and the wireless identification device 18 (FIG. 2).

The wireless identification device 18 is configured to transmit, in a wireless fashion, data that is input or entered into the data input device 20 to the interrogator 12. The interrogator 12 communicates with the wireless identification device 18 via an electromagnetic link, such as via an RF link (e.g., at microwave frequencies, in one embodiment). All transmissions by the interrogator 12 are heard simultaneously by all remote data telemetry devices 14 within range (e.g. within a building or room). The remote data telemetry device 14 may include one or more antennas coupled to the wireless identification device 18. In the illustrated embodiment, the remote data telemetry device 14 includes a dipole transmit antenna 24 coupled to the wireless identification device 18, and a loop receive antenna 26. Similarly, one or more antennas may be coupled to the interrogator 12. In the illustrated embodiment, separate transmit and receive antennas 28 and 30 are coupled to the interrogator 12. In one embodiment, the wireless identification device 18 comprises a Microstamp (TM) integrated circuit available from Micron Communications, Inc., 3176 S. Denver Way, Boise, Id. 83705.

An electronic identification system typically includes two transponders: an interrogator, and a transponder device which replies to the interrogator. An electronic identification system which can be used as a radio frequency identification device, and various applications for such devices are described in detail in commonly assigned U.S. patent application Ser. No. 08/705,043, filed Aug. 29, 1996, now U.S. Pat. No. 6,130,602, and incorporated herein by reference.

The interrogator 12 sends out a command that is spread around a certain center frequency (e.g, 2.44 GHz). After the interrogator 12 transmits the command, and is expecting a response, the interrogator 12 switches to a CW mode (continuous wave mode). In the continuous wave mode, the interrogator 12 does not transmit any information. Instead, the interrogator 12 just transmits radiation at the center frequency. In other words, the signal transmitted by the interrogator 12 is not modulated. After the wireless identification device 18 receives a command from the interrogator 12, the wireless identification device 18 processes the command. The wireless identification device 18 can operate in a backscatter mode or in a conventional transmission mode. If the wireless identification device 18 is in the backscatter mode, it alternately reflects or does not reflect the signal from the interrogator 12 to send its reply. For example, in the illustrated embodiment, two halves of a dipole antenna are either shorted together or isolated from each other.

In one embodiment, the data input device 20 comprises a tactile input device 42 such as a keyboard or mouse (FIG. 1). More particularly, in the illustrated embodiment, the tactile input device includes keys 44. The keys 44 may be spring loaded keys such as those found on computer keyboards, light touch keys or membrane keys, keys on a touch screen interface, etc. In the illustrated embodiment, the tactile input device 42 comprises a membrane technology keyboard. The term keyboard as used herein and in the accompanying claims is to be interpreted as being any type of keyboard or keypad, and not necessarily a "QWERTY" keyboard. For example, keyboards of the type used in point of sale terminals can be employed.

In one embodiment, the remote data telemetry device 14 further comprises a selectively openable cash drawer 46 coupled to the keyboard 42 (FIG. 1). The keyboard 42 selectively sends an open signal to the cash drawer 46 in a conventional manner, such as when a key 44 is pressed or a sequence of keys 44 indicating that an item has been purchased have been pressed. The cash drawer 46 opens in response to the open signal from the keyboard 42. In one embodiment, the keyboard 42 comprises keys 44 that are programmable to represent items that can be purchased. For example, to minimize calculations to be performed by an operator, a picture of an item available for sale can be displayed on a key 44, and pressing that key 44 results in a calculation or actions appropriate for purchase of the item pictured on the key 44.

Figure 4:
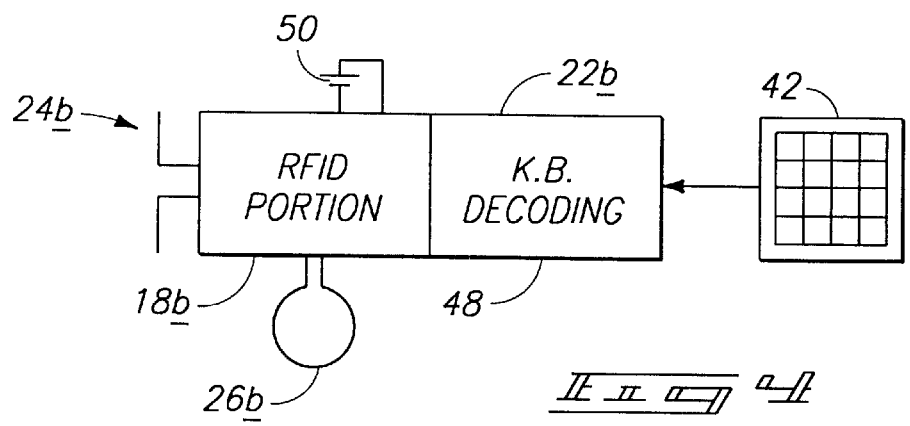
FIG. 4 is a block diagram illustrating components included in the remote data telemetry device of FIG. 1 in accordance with an alternative embodiment of the invention.

In one embodiment, the decoder 22 is a keyboard decoder. A keyboard decoder 22B can be included in an integrated circuit 48 with a wireless identification device 18B (FIG. 4). The keyboard decoder 22B is substantially similar to the keyboard decoder 22, and the wireless identification device 18B is substantially similar to the wireless identification device 18, except that the keyboard decoder 22B and wireless identification device 18B are in a common integrated circuit. The wireless identification device 18B is coupled to a dipole transmit antenna 24B, a loop receive antenna 26B. In another embodiment, one or more separate integrated circuits are employed for the decoder (FIGS. 2 and 5).

The wireless identification device 18 or 18B is an active radio frequency identification device. In other words, it does not receive its power from the interrogator 12, but instead is coupled to a power source 50 (FIG. 4). In the illustrated embodiment, a power source or supply 50 is connected to the integrated circuit 48 (or the integrated circuit 18) to supply power to the integrated circuit. In one embodiment, the power source comprises a battery. If the power supply 50 is a battery, the battery can take any suitable form. Preferably, the battery type will be selected depending on weight, size, and life requirements for a particular application. In one embodiment, the battery is a thin profile button-type cell forming a small, thin energy cell more commonly utilized in watches and small electronic devices requiring a thin profile. In an alternative embodiment, the power source comprises a series connected pair of button type cells.

In another embodiment, an AC adapter 52 is employed to convert household AC current from an outlet 54 to a DC voltage (FIG. 1). The DC voltage is used to power both the radio frequency identification device and the keyboard decoder whether or not they are defined by a single integrated circuit. More particularly, in the illustrated embodiment, the AC adapter 54 supplies power to the radio frequency identification device 18, the keyboard decoder 22, and other components of the point of sale device such as the keyboard 20, cash drawer 46, etc.

In one embodiment, the system further includes one or more additional remote data telemetry devices 56 (FIG. 1). The remote data telemetry device 56 may be substantially identical to the remote data telemetry device 14. The remote data telemetry device 56 includes a wireless identification device 18, a data input device 20, and a decoder 22 coupled to the data input device 20 and the wireless identification device 18. The wireless identification device 18 of the remote data telemetry device 56 is configured to transmit data input into the data input device 20 of the remote data telemetry device 56 to the interrogator 12. The wireless identification device 18 of the remote data telemetry device 56 comprises an integrated circuit 32 including a processor 34, a memory 36 in communication with the processor 34, and a transmitter 38 such as a backscatter modulator in communication with the processor 34.

The memory 36 of the remote data telemetry device 14 is configured to store first identification indicia, such as an identification number, and the memory 36 of the remote data telemetry device 56 is configured to store second identification indicia, such as a second identification number, different from the first identification indicia. In one embodiment, the identification numbers are unique; i.e., the identification numbers of all wireless identification devices 18 used with an interrogator 12 have different identification numbers. In the embodiment shown in FIG. 1, more than two wireless identification devices 18 are used with one interrogator 12. The number of wireless identification devices 18 used in a store, for example, could correspond to the number of point of sale terminals in the store.

The interrogator 12 is configured to distinguish data transmitted by the second remote data telemetry device 56 from data transmitted by the first remote data telemetry device 14. More particularly, the first remote data telemetry device 14 is configured to selectively transmit the first identification indicia to the interrogator 12, in addition to data input into the keyboard 42. The second remote data telemetry device is configured to selectively transmit the second identification indicia to the interrogator 12. An exemplary interrogator 12 is described in commonly assigned U.S. patent application Ser. No. 08/907,689, filed Aug. 8, 1997, now U.S. Pat. No. 6,289,209 and incorporated herein by reference.

The system 10 may further include a store computer 58, such as a mainframe, mini computer, or personal computer, used for accounting or inventorying. Such a computer 58 may be coupled to the interrogator 12 or may be used to define the interrogator 12. The computer 58, by receiving information from the data telemetry devices 14, can perform inventorying. For example, if a product has been purchased, the product or raw ingredients for the product can be subtracted from existing inventory. The computer 58 may be coupled to a local area network or wide area network for communication of information between stores or establishments.

In operation, the interrogator 12 transmits an interrogation signal or command via the antenna 28. All wireless identification devices 18 receive the incoming interrogation signal via the antennas 26. Upon receiving the signal, the wireless identification device 18 determines if a command is addressed to it and, if so, responds by generating and transmitting a responsive signal or reply. The responsive signal typically includes information that uniquely identifies, or labels the particular wireless identification device 18 that is transmitting, so as to identify the particular remote data telemetry device 14 with which the wireless identification device 18 is associated.

The interrogator 12 typically has prior knowledge of the identification number of a wireless identification device 18 which the interrogator 12 is looking for in an environment where the wireless identification devices 18 do not frequently move. If the interrogator 12 has such prior knowledge, the interrogator 12 can specify that a response is requested only from the device 18 with that identification number. To target a command at a specific remote data telemetry device 14, (i.e., to initiate point-on-point communication), the interrogator 12 must send a number identifying a specific device 14 along with the command. Thus, the interrogator 12 can periodically poll all the devices 14 in a facility to determine if they have any data to transmit to the interrogator 12.

FIG. 5 illustrates components that can be used to manufacture the decoder 22, in one embodiment of the invention. Generally, data from the keyboard 20 must be serialized to be input into the wireless identification device 18.

The decoder 22 shown in FIG. 5 includes a key encoder 62. The key encoder 62 is selected depending on the number of keys 44 in the keyboard 20. In the illustrated embodiment, the keyboard 20 has 20 keys, and the key encoder 62 is a MM54C923 or MM74C923 20-key encoder available from National Semiconductor. The encoder 62 assumes the keys 44 of the keyboard are single pole, single throw switches, which they are in the illustrated embodiment. The encoder 62 includes row inputs Y0, Y1, Y2, Y3, coupled to respective rows of keys of the keyboard 20, and column inputs X0, X1, X2, X3, X4, coupled to respective columns of keys 44 of the keyboard 20. The encoder 62 has a Data Available output DA which goes high when a valid keyboard entry has been made. The encoder 62 further has Data Out outputs A, B, C, D, and E.

The decoder 22 further includes a parallel-in, serial-out, 8-bit shift register 64. The shift register 64 has parallel inputs A–H. Parallel inputs DB–F are coupled to the A–E outputs of the key encoder 62. The shift register 64 further has clock and Shift/Load (LD') inputs. The shift register shifts data from A to H when clocked. Parallel inputs to each stage are enabled by a low level and the Shift/Load input.

The decoder 22 further includes timer circuitry 66 controlling clocking and parallel inputs. In the illustrated embodiment, the timer circuitry 66 produces a clock pulse every ten microseconds.

The decoder 22 further includes a D flip-flop 68 having a data input coupled to a logical one (Vcc), having a clock input coupled to the Data Available output DA of the key encoder 62, having a clear input CLR coupled to the timer 66, and having an output Q coupled to the parallel input H. The D flip-flop 68 is used to provide a signal indicating that a key 44 was pressed since: the last read. The D flip-flop 68 is used by the wireless identification device 18 to determine if a key 44 has been pressed since the wireless identification device 18 last read the encoder 62. The data available output DA is only set during the depression of a key. Thus, the D flip-flop 68 provides a way for the wireless identification device 18 to know if the keyboard was pressed in the event the wireless identification device reads the keyboard at a time other than while a key 44 is pressed.

Parallel input A is undefined (coupled to Vcc). The shift register 64 has a serial output $Q_H$ coupled to the integrated circuit for the wireless identification device 18. The serial output produces eight bit words where the first five bits are binary code representing the key 44 that is pressed, the next bit has a value indicating whether a key 44 is pressed, the next bit has a value indicating that key was pressed since the last data read, and the final bit is undefined.

In an alternative embodiment, a programmable logic device (PLD) is employed to serialize the data from the keyboard 20. In another alternative embodiment, the circuitry defined by the interface 22 is incorporated in an integrated circuit including the wireless identification device 18.

The invention advantageously eliminates the wire that is necessary in conventional data terminals used for data entry. Data can be entered remotely, without a wire, using an inexpensive device. An existing integrated circuit radio frequency identification device is modified in a straightforward manner, requiring only the addition of decoder circuitry and bonding pads. The device is made very inexpensively. In the illustrated embodiment, a membrane switch technology keyboard is combined with the single chip radio frequency identification device integrated circuit.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A point of sale device for use with an interrogator configured to transmit a command to the point of sale device and thereafter transmit a continuous wave, the point of sale device comprising:
    an RFID defined by a single integrated circuit and including a backscatter modulator, and an active transmitter and being configured to transmit using a selectable one of the backscatter modulator and the active transmitter;
    a tactile input device;
    a decoder coupled to the tactile input device and the wireless identification device, the wireless identification device being configured to receive data input into the tactile input device and to transmit the data by selectively reflecting or not reflecting the continuous wave generated by the interrogator when using the backscatter modulator; and
    a selectively openable cash drawer coupled to the tactile input device, the tactile input device being configured to selectively send a signal to the cash drawer, and the cash drawer being configured to open in response to the signal from the tactile input device.

2. A point of sale device in accordance with claim 1 wherein the tactile input device comprises a keyboard, and wherein the decoder comprises a keyboard decoder.

3. A point of sale device in accordance with claim 1 wherein the wireless identification device comprises an integrated circuit including a receiver, a modulator, and a microprocessor in communication with the receiver and modulator.

4. A point of sale device in accordance with claim 1 and wherein the wireless identification device and the decoder are defined by a single integrated circuit.

5. A point of sale device comprising:
    a keyboard;
    a keyboard decoder coupled to the keyboard;
    a radio frequency identification device coupled to the keyboard, the radio frequency identification device including a backscatter modulator and an active transmitter and being configured to transmit, by radio frequency, data entered into the keyboard, using a selectable one of the backscatter modulator and the active transmitter; and
    a selectively openable cash drawer coupled to the keyboard, the keyboard being configured to selectively send a signal to the cash drawer, and the cash drawer being configured to open in response to the signal from the keyboard.

6. A point of sale device in accordance with claim 5 wherein the radio frequency identification device further includes a memory configured to store a unique identification number, and wherein the radio frequency identification device is configured to transmit the unique identification number as well as the data input into the keyboard.

7. A point of sale device in accordance with claim 5 wherein the radio frequency identification device is an active radio frequency identification device.

8. A point of sale device in accordance with claim 5 wherein the keyboard comprises keys that are programmable to represent items that can be purchased.

9. A point of sale device in accordance with claim 5 wherein the radio frequency identification device is defined by an integrated circuit.

10. A point of sale device in accordance with claim 5 wherein the radio frequency identification device and the keyboard decoder are defined by a single integrated circuit.

11. A method of remote data telemetry comprising:
    providing an interrogator;
    providing a point of sale device including a wireless identification device defined by a single integrated circuit and including a backscatter modulator, and an active transmitter and being configured to transmit using a selectable one of the backscatter modulator and the active transmitter, a data input device, a decoder coupled to the data input device and the wireless identification device, and a selectively openable cash drawer coupled to the data input device, the wireless identification device being configured to transmit data that has been input into the data input device to the interrogator, the cash drawer being configured to open in response to a signal from the data input device;
    providing a second point of sale device including a second wireless identification device defined by a single integrated circuit and including a backscatter modulator, and an active transmitter and being configured to transmit using a selectable one of the backscatter modulator and the active transmitter, a second data input device, a second decoder coupled to the second data input device and the second wireless identification device, and a second selectively openable cash drawer coupled to the second data input device, the second wireless identification device being configured to transmit data that has been input into the second data input device to the interrogator, the second cash drawer being configured to open in response to a signal from the second data input device, the interrogator being configured to distinguish data transmitted by the second point of sale device from data transmitted by the first point of sale device;
    entering data into the first data input device and effecting wireless transmission of the data from the first point of sale device to the interrogator;

entering data into the second data input device and effecting wireless transmission of the data from the second point of sale device to the interrogator;

coupling the first wireless identification device and the first data input device to a common power source; and coupling the second wireless identification device and the second data input device to a second common power source.

12. A method of remote data telemetry in accordance with claim 11 wherein the first wireless identification device includes memory configured to store first identification indicia, wherein the second wireless identification device includes memory configured to store second identification indicia different from the first identification indicia, the method further comprising effecting transmission of the first identification indicia to the interrogator from the first wireless identification device, and effecting transmission of the second identification indicia to the interrogator from the second wireless identification device.

13. A point of sale device comprising:

a keyboard, wherein the keyboard comprises keys that are programmable to represent items that can be purchased;

a keyboard decoder coupled to the keyboard;

a radio frequency identification device defined by a single integrated circuit and including a backscatter modulator, and an active transmitter and being configured to transmit using a selectable one of the backscatter modulator and the active transmitter, the radio frequency identification device being configured to be coupled to the keyboard, the radio frequency identification device being configured to transmit, by radio frequency, data entered into the keyboard; and a selectively openable cash drawer coupled to the keyboard, the keyboard being configured to selectively send a signal to the cash drawer, and the cash drawer being configured to open in response to the signal from the keyboard.

14. A point of sale device in accordance with claim 13 wherein the radio frequency identification device further includes a memory configured to store a unique identification number, and wherein the radio frequency identification device is configured to transmit the unique identification number as well as the data input into the keyboard.

15. A point of sale device in accordance with claim 13 wherein the radio frequency identification device is an active radio frequency identification device.

16. A point of sale device in accordance with claim 13 wherein the radio frequency identification device and the keyboard decoder are defined by a single integrated circuit.

17. A point of sale device in accordance with claim 13 wherein the radio frequency identification device and the keyboard decoder are defined by a single integrated circuit.

18. A point of sale device comprising:

a keyboard;

a keyboard decoder coupled to the keyboard;

a radio frequency identification device coupled to the keyboard, the radio frequency identification device being configured to transmit, by radio frequency, data entered into the keyboard; and a selectively openable cash drawer coupled to the keyboard, the keyboard being configured to selectively send a signal to the cash drawer, and the cash drawer being configured to open in response to the signal from the keyboard, wherein the radio frequency identification device is defined by a single integrated circuit and includes a backscatter modulator and an active transmitter and is configured to transmit using a selectable one of the backscatter modulator and the active transmitter.

* * * * *

UNITED STATES PATENT AND TRADEMARK OFFICE
CERTIFICATE OF CORRECTION

PATENT NO.     : 6,388,561 B1
DATED          : May 14, 2002
INVENTOR(S)    : John R. Tuttle It is certified that error appears in the above-identified patent and that said Letters Patent is hereby corrected as shown below:

Title page,
Item [56], References Cited, insert -- 5,164,985  A  11/1992  Nysen et al.  380/9 --

Column 1,
Line 47, replace "to the interrogator.__An electronic" with -- to the interrogator. An electronic --

Column 6,
Line 55, replace "pressed since: the last read." with -- pressed since the last read. --

Signed and Sealed this

Thirty-first Day of December, 2002

JAMES E. ROGAN
*Director of the United States Patent and Trademark Office*